US012486850B2

United States Patent
Lu et al.

(10) Patent No.: US 12,486,850 B2
(45) Date of Patent: *Dec. 2, 2025

(54) SYSTEMS AND METHODS FOR PREVENTION OF ROTATION IN PERMANENT MAGNET MOTORS

(71) Applicant: Baker Hughes Oilfield Operations LLC, Houston, TX (US)

(72) Inventors: Xiaonan Lu, Tulsa, OK (US); Joseph Robert McManus, Tulsa, OK (US); Howard G. Thompson, Claremore, OK (US); Sean A. Cain, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,314

(22) Filed: Apr. 10, 2023

(65) Prior Publication Data
US 2023/0323884 A1 Oct. 12, 2023

Related U.S. Application Data

(63) Continuation of application No. 17/031,602, filed on Sep. 24, 2020, now Pat. No. 11,649,827.

(60) Provisional application No. 62/906,318, filed on Sep. 26, 2019.

(51) Int. Cl.
*F04D 13/10* (2006.01)
*E21B 43/12* (2006.01)
*F16D 41/067* (2006.01)

(52) U.S. Cl.
CPC ............ *F04D 13/10* (2013.01); *E21B 43/128* (2013.01); *F16D 41/067* (2013.01)

(58) Field of Classification Search
CPC ...... F04D 13/10; F04D 13/021; F16D 41/067; F16D 41/066; F16D 41/12; F16D 41/064; F16D 2001/103; F16D 1/06; F05D 2260/4023; F05D 2260/403; E21B 43/128
USPC ..................................... 417/214, 223, 423.6
See application file for complete search history.

(56) References Cited

U.S. PATENT DOCUMENTS

| 2,044,197 | A | * | 6/1936 | Barthel | F16D 41/064 |
| | | | | | 192/42 |
| 3,802,803 | A | * | 4/1974 | Bogdanov | F04B 47/06 |
| | | | | | 418/48 |
| 3,918,830 | A | * | 11/1975 | Schneider | F16D 47/02 |
| | | | | | 376/281 |
| 4,087,204 | A | * | 5/1978 | Niedermeyer | F04D 15/0218 |
| | | | | | 417/63 |
| 4,232,770 | A | * | 11/1980 | Tuzson | F16D 13/04 |
| | | | | | 192/93 A |

(Continued)

*Primary Examiner* — Mark A Laurenzi
*Assistant Examiner* — Benjamin Doyle
(74) *Attorney, Agent, or Firm* — Baker Hughes Company

(57) ABSTRACT

Systems and methods for preventing rotation of an ESP motor when the motor is not powered on, thereby preventing the motor from acting as a generator when fluid flowing through the pump section of the ESP applies a torque to the motor. In one embodiment, an ESP has a motor section, a pump section. The ESP may include a directional coupling that allows unidirectional rotation between the motor shaft and a pump shaft of the pump section, and a directional lock that allows unidirectional rotation between the motor shaft and a housing of the motor section. The directional coupling and directional lock allow the pump shaft to freewheel in the forward direction without causing the motor shaft to rotate, and prevent the pump shaft and motor from rotating in the reverse direction.

16 Claims, 5 Drawing Sheets

(56) References Cited

U.S. PATENT DOCUMENTS

| | | | | |
|---|---|---|---|---|
| 4,262,786 | A * | 4/1981 | Taylor | F16D 41/12 192/48.92 |
| 4,763,764 | A * | 8/1988 | Smith | F16D 43/18 192/72 |
| 5,350,242 | A * | 9/1994 | Wenzel | E21B 4/003 384/97 |
| 6,167,965 | B1 * | 1/2001 | Bearden | E21B 47/0175 417/18 |
| 6,478,129 | B2 * | 11/2002 | Lambertini | F16D 43/18 192/105 CD |
| 6,889,765 | B1 * | 5/2005 | Traylor | F04B 43/1136 166/105.5 |
| 9,061,751 | B2 * | 6/2015 | Tanaka | B63H 23/30 |
| 9,739,319 | B2 * | 8/2017 | Aramoto | F16D 41/066 |
| 10,081,984 | B2 * | 9/2018 | Tulloch | F16D 41/14 |
| 10,411,557 | B2 * | 9/2019 | Hashish | H02K 7/07 |
| 10,655,691 | B2 * | 5/2020 | Iwano | F16D 41/067 |
| 2002/0056602 | A1 * | 5/2002 | Aurora | F16D 41/063 192/46 |
| 2003/0085091 | A1 * | 5/2003 | Ichihara | F16D 41/067 192/45.006 |
| 2004/0262043 | A1 * | 12/2004 | Schuaf | E21B 43/12 175/57 |
| 2006/0021841 | A1 * | 2/2006 | Kimes | F16D 41/12 192/46 |
| 2006/0185957 | A1 * | 8/2006 | Kimes | F16D 41/12 192/48.601 |
| 2007/0183900 | A1 * | 8/2007 | Ocalan | E21B 43/128 417/1 |
| 2008/0078647 | A1 * | 4/2008 | Watanabe | F16D 41/064 192/41 A |
| 2008/0110715 | A1 * | 5/2008 | Pawley | F16D 41/125 192/43.1 |
| 2008/0179156 | A1 * | 7/2008 | Byun | F16D 41/066 192/45.1 |
| 2010/0150751 | A1 * | 6/2010 | Merrill | H02K 5/132 277/336 |
| 2011/0214963 | A1 * | 9/2011 | Beylotte | F16D 41/16 192/106 R |
| 2012/0051944 | A1 * | 3/2012 | Moss | F04D 13/024 416/169 R |
| 2014/0102721 | A1 * | 4/2014 | Bespalov | E21B 19/22 166/385 |
| 2014/0102844 | A1 * | 4/2014 | Greene | F16D 41/12 192/45.1 |
| 2014/0368143 | A1 * | 12/2014 | Breitzmann | H02M 7/5387 318/380 |
| 2015/0204390 | A1 * | 7/2015 | Kimes | F16D 41/125 192/84.8 |
| 2015/0240569 | A1 * | 8/2015 | Downie | F16D 41/069 192/45.1 |
| 2015/0275581 | A1 * | 10/2015 | Agarwal | E21B 4/00 175/57 |
| 2016/0312590 | A1 * | 10/2016 | Chang | F04B 17/03 |
| 2017/0306731 | A1 * | 10/2017 | Xiao | F04B 47/06 |
| 2018/0058518 | A1 * | 3/2018 | Uppal | F16D 25/12 |
| 2018/0316240 | A1 * | 11/2018 | Chelaidite | F16D 65/22 |
| 2019/0284922 | A1 * | 9/2019 | Smith | E21B 47/06 |
| 2019/0323568 | A1 * | 10/2019 | Uppal | F16D 41/12 |
| 2020/0063541 | A1 * | 2/2020 | Davis | F04D 29/043 |
| 2020/0166088 | A1 * | 5/2020 | Leonov | F16D 41/185 |
| 2020/0263614 | A1 * | 8/2020 | Oyama | F16D 41/12 |
| 2020/0291681 | A1 * | 9/2020 | Markanday | B60R 25/02156 |
| 2021/0340818 | A1 * | 11/2021 | Lund | E21B 4/02 |

\* cited by examiner

SYSTEMS AND METHODS FOR PREVENTION OF ROTATION IN PERMANENT MAGNET MOTORS

RELATED APPLICATIONS

This application is a continuation of, and claims a benefit of priority under 35 U.S.C. 120 of, U.S. patent application Ser. No. 17/031,602 filed Sep. 24, 2020, entitled "SYSTEMS AND METHODS FOR PREVENTION OF ROTATION IN PERMANENT MAGNET MOTORS", which claims a benefit of priority under 35 U.S.C. § 119 to U.S. Provisional Application No. 62/906,318 filed Sep. 26, 2019, entitled "SYSTEMS AND METHODS FOR PREVENTION OF ROTATION IN PERMANENT MAGNET MOTORS", which are fully incorporated herein by reference for all purposes.

BACKGROUND

Field of the Invention

The invention relates generally to downhole electric equipment, and more particularly to systems and methods for preventing rotation of a motor shaft in an electric submersible pump (ESP) when the ESP is not in operation.

Related Art

Oil is typically produced by drilling wells into oil reservoirs in geological formations and then pumping the oil out of the reservoirs through the wells. Commonly, the oil is produced using ESPs that are deployed in the wells. Electric power suitable for the respective ESPs is normally generated by electric drive systems that are positioned at the surface of each well, and is conveyed from the drive to the ESP via a power cable that extends from the drive system to the deployed ESP.

An ESP typically includes a pump section, a seal section, and a motor section. The power from the electric drive system is provided to the motor, which drives the pump section. Frequently, the motor is a rotary motor which drives a shaft that is coupled to the shaft of a centrifugal pump. The rotating motor shaft causes the pump shaft to rotate, generating fluid pressure that forces fluid out of the well.

The motor is typically one of two types: an induction motor; or a permanent magnet motor. In the case of an induction motor, power (usually three-phase AC power) is provided to the windings of the motor's stator, causing the stator to generate rotating magnetic fields in the stator. These rotating magnetic fields induce currents and corresponding magnetic fields in a rotor, causing the rotor and the motor shaft to rotate and drive the pump. In the case of a permanent magnet motor, three-phase AC power is provided to the motor's stator windings, generating rotating magnetic fields as in the induction motor. The rotor of the permanent magnet motor, however, has a set of permanent magnets which cause the rotor to rotate in the rotating magnetic fields generated by the stator.

As explained above, in normal operation, power supplied to a conventional permanent magnet ESP motor causes the motor to rotate, which causes fluid (e.g., oil) to flow through the pump. What is less frequently considered, however, is that the reverse of this sequence may also be true. In other words, the motor can act as a generator. If fluid is caused to flow through the pump, this will cause the pump to rotate, which will in turn cause the motor to rotate and generate an AC voltage which is applied to the conductors of the power cable. The generated voltage is often unexpected since the motor normally consumes electrical energy, and it may be dangerous or even fatal to persons working on the system. It would therefore be desirable to provide means to protect these people from the electric potential that may be generated by an ESP motor acting as a generator.

SUMMARY

This disclosure is directed to systems and methods for manufacturing and operating motors that reduce or eliminate one or more of the problems above. Generally, these systems and methods involve providing mechanisms in ESP motors to prevent rotation of the motor and thereby prevent the motor from generating dangerous electrical potentials when it is not being driven in normal operation.

One embodiment comprises an ESP system having a motor section, a pump section, and a directional coupling, where the directional coupling is configured to allow a motor shaft of the motor section to rotate in a forward direction when the motor section is powered on, and to prevent the motor shaft from rotating when the motor section is powered off. In some embodiments, the directional coupling may include a directional shaft coupling which couples the motor shaft to a pump shaft of the pump section. The directional shaft coupling enables the pump shaft to freewheel in the forward direction without causing the motor shaft to rotate, but drives the pump shaft in the forward direction when the motor shaft rotates the directional shaft coupling in the forward direction. The directional coupling may include a first ratcheting mechanism which is configured to enable the motor shaft to rotate in a forward direction with respect to a housing of the motor section when a voltage is applied to the motor section, and a second ratcheting mechanism which is configured to enable the pump shaft to rotate in a forward direction with respect to the motor shaft.

In some embodiments, the directional coupling may also include a directional lock which is configured to enable rotation of the motor shaft in the forward direction with respect to the housing of the motor section, while preventing rotation of the motor shaft in the reverse direction with respect to the motor section housing. In some embodiments, the ESP system may include a seal section that is positioned between the pump section and the motor section, where the seal section has a seal shaft that is coupled between the motor shaft and the pump shaft, and where the seal shaft is secured to the pump shaft so that the pump shaft cannot rotate with respect to the seal shaft. The directional shaft coupling enables the seal shaft to freewheel in the forward direction without causing the motor shaft to rotate, but drives the seal shaft in the forward direction when the motor shaft rotates the directional shaft coupling in the forward direction.

In some embodiments, the directional coupling comprises a combined directional unit that is installed between the motor section and the seal section, wherein the combined directional unit is secured to the motor shaft and a seal shaft of the seal section. The combined directional unit may comprise an outer shell which is secured to the motor shaft and an insert that is secured to the seal shaft of the seal section. The insert is positioned coaxially within the outer shell, which has a plurality of wedge-shaped recesses in its interior surface. Each of a set of rollers is positioned between the insert and the outer shell in a corresponding one of the wedge-shaped recesses. Rotation of the insert in a forward direction with respect to the outer shell causes each roller to roll toward a wider end of the corresponding wedge-shaped recess, so that the insert and the seal shaft freewheel in the forward direction with respect to the outer shell and the motor shaft. Rotation of the outer shell in the forward direction with respect to the insert causes each roller to roll toward a narrower end of the corresponding wedge-shaped recess, thereby frictionally engaging the insert and the outer shell so that the insert and the seal shaft are prevented from rotating in the reverse direction with respect to the outer shell.

In some embodiments, the directional coupling is configured to enable unidirectional rotation between the motor shaft and a pump shaft of the pump section, and unidirectional rotation between the motor shaft and a housing of the motor section, so that the pump shaft freewheels in a forward direction without causing the motor shaft to rotate in the forward direction, and both the pump shaft and motor are prevented from rotating in the reverse direction. In some embodiments, the directional coupling comprises a centrifugally activated clutch which selectively engages the motor shaft and pump shaft when the motor is operated to drive the motor shaft in the forward direction. In some embodiments, the directional coupling comprises a solenoid which is configured to disengage the motor shaft when a voltage from a drive unit is applied to the motor section, thereby allowing rotation of the motor shaft, and where the solenoid is configured to engage the motor shaft when no voltage is applied to the motor section, thereby preventing rotation of the motor shaft. In some embodiments, a pin may be mounted on the solenoid, where the pin is configured to alternately engage and disengage a hole in the shaft.

An alternative embodiment comprises an apparatus including a directional coupling which is adapted to be coupled to a motor shaft of an ESP motor, where the directional coupling is configured to allow the motor shaft in a forward direction when the motor is powered on, and to prevent the motor shaft from rotating when the motor is powered off. Another alternative embodiment comprises a method for preventing reverse rotation of a motor shaft in an ESP motor, including engaging the motor shaft with a pump shaft when the motor is powered on and selectively disengaging the motor shaft from the pump shaft when the motor is powered off. The pump shaft may be allowed to freewheel in the forward direction when the motor is powered off. The motor shaft may be locked when the motor is powered off to prevent its rotation.

Numerous other embodiments may also be possible.

BRIEF DESCRIPTION OF THE DRAWINGS

Other objects and advantages of the invention may become apparent upon reading the following detailed description and upon reference to the accompanying drawings.

Figure 1:
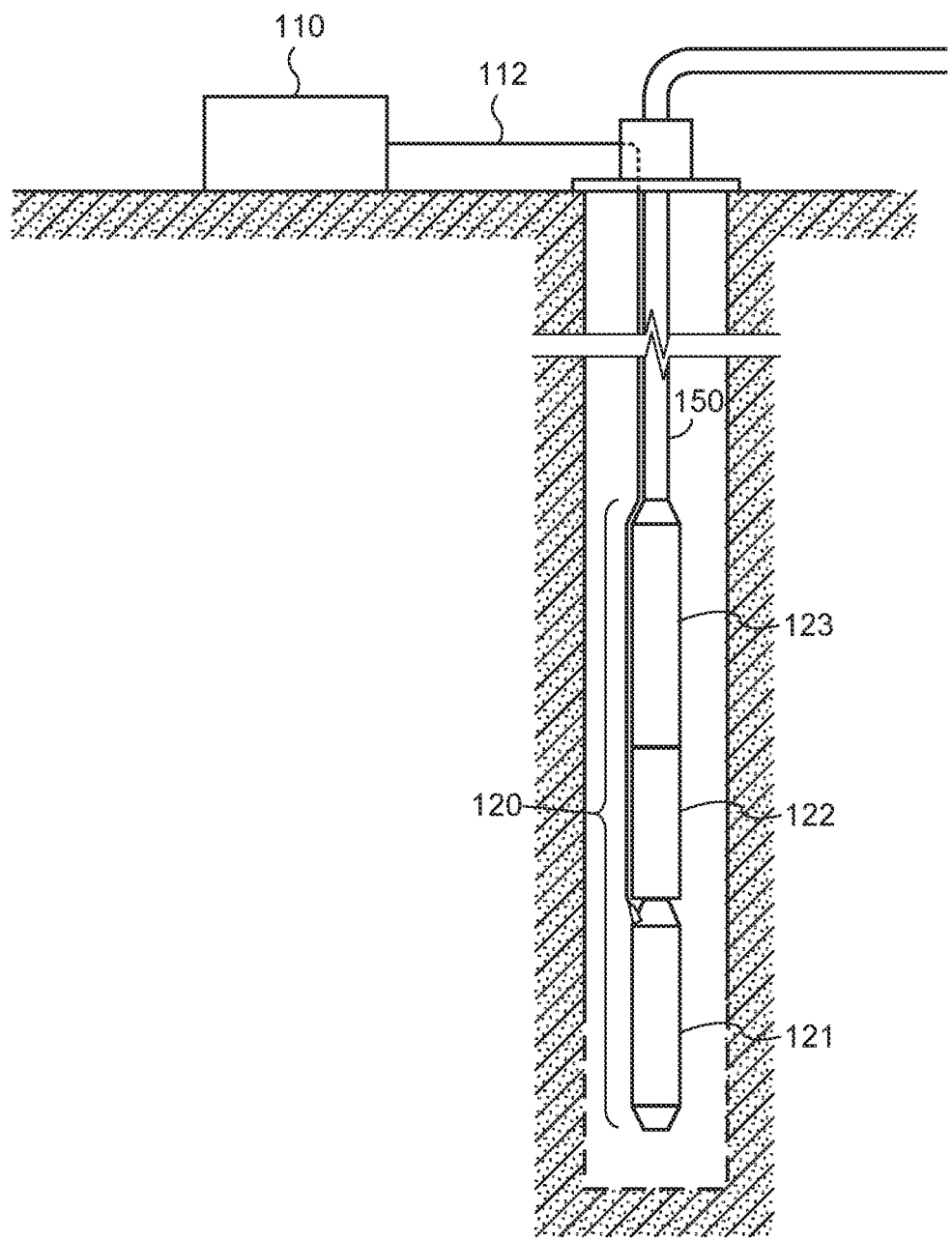
FIG. 1 is a diagram illustrating an conventional ESP system installed in a well.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for preventing rotation of an ESP motor when the motor is not powered on, thereby preventing the motor from acting as a generator when fluid flowing through the pump section of the ESP applies a torque to the motor.

As noted above, a permanent magnet motor in an ESP can act as a generator when fluid flowing through the pump causes the motor to rotate. This may occur in a number of different circumstances. For example, during certain well operations such as running the equipment in the well, or pulling the equipment from the well, fluid may be forced through the pump. Fluid flowing through the pump may also result from well conditions such as natural flow of well fluids, or fluids "bull heading" through the pump. During one of these occurrences, the permanent magnet motor can generate enough electricity to be fatal.

It should be noted that, since induction motors do not use magnets on their rotors, the rotation of these motors is not likely to present as much of a hazard as permanent magnet motors. Induction motors can, however, have some residual magnetism that may cause them to generate electricity when rotated by fluid flowing through the pump. Embodiments of the invention may therefore be applicable to induction motors and other types of motors that are used in ESPs, even though they do not normally present the same level of hazard as permanent magnet motors.

Because of the electrical hazard presented by permanent magnet ESP motors in conditions where fluids flowing through the pump may rotate the rotor (e.g., while installing, pulling, operating or troubleshooting the ESP), embodiments of the present invention prevent the permanent magnet rotor from rotating when the motor is not being driven (i.e., when the motor is not powered on). By preventing rotation of the rotor, the potential for the motor to generate electricity is eliminated. This provides a key safety advantage over prior art permanent magnet motors. By implementing this feature in a mechanical design, embodiments provide a reliable solution with minor impact to the existing product design.

In an exemplary embodiment, the ESP system includes a multistage centrifugal pump section, a seal section, an ESP motor, and a power cable which transfers electrical power from an electric drive at the surface of the well to the motor, which is downhole in the well. The motor is a three-phase permanent magnet motor. The motor consists of a stator assembly (which may be referred to herein simply as a stator) and a permanent-magnet-type rotor that is affixed to a motor shaft. Support bearings are provided along the shaft and at the ends of the shaft.

When power is applied to the stator, the motor will run, rotating the rotor and shaft in a direction determined by the design of the motor (this direction may be clockwise or counterclockwise, depending on the pump design. Mechanical power is transferred through the seal and to the pump. This is the desired operation condition.

When power is not applied, the permanent magnet motor has the potential to become a generator when turned. Liquid passing through the pump (in either direction) in a conventional ESP system will cause the pump stages to rotate, and the rotation will be transferred to the motor from the pump and seals section shaft. The rotation direction will depend on the direction of flow through the pump. The motor may potentially generate a high voltage, depending on the stator design and the rotational speed of the rotor. The electricity that is generated by the motor will be transferred back to the surface through the cable. This is an undesirable condition due to the potential to generate electrical energy in the system, such that unprotected personnel or equipment can be harmed or killed by the electricity.

Embodiments disclosed herein allow the permanent magnet motor of an ESP to rotate in the proper direction when power is applied, but prevent rotation when fluid flows through the pump (in either direction). In some embodiments, a directional coupling assembly is placed in between the shafts of the seal section and motor section of the ESP. The directional coupling assembly may alternatively be positioned at any connection point between the top of the motor and the bottom of the pump. This coupling serves as a clutch which engages the motor rotation and pump rotation in one direction and disengages them in the other direction.

The directional coupling assembly allows the motor section to drive the pump section when power is applied in the proper direction. When power is not applied and the pump is driven by fluid in the forward direction, the directional coupling will declutch the pump from the motor, allowing the pump to freewheel in the allowed forward direction. This will prevent the motor shaft from being driven by the pump to rotate and generate electricity. When power is not applied and the pump is in backspin (reverse rotation), the directional coupling clutches the pump and the motor, urging the motor to rotate in the reverse direction. A directional lock is therefore placed at a location where it can engage the motor shaft (e.g., below the bottom of the pump shaft). It can, for example, be mounted on the shaft or connected to the shaft to allow a single direction of shaft rotation (the same direction the directional coupling allows), and to lock the shaft against the ESP's stationary housing when the shaft is urged to rotate in the other direction. The combination of the directional coupling and directional lock will allow the motor shaft to rotate in a single direction when it's powered on and prevent the rotor from rotating in either direction when the motor is not powered on.

Referring to FIG. 1, a diagram illustrating an ESP system is shown. In this embodiment, an ESP system is installed in a well for the purpose of producing oil, gas or other fluids. The ESP 120 is coupled to the end of tubing string 150, and the ESP and tubing string are lowered into the wellbore to position the ESP in a producing portion of the well (as indicated by the dashed lines at the bottom of the wellbore). Surface equipment which includes an electric drive system 110 is positioned at the surface of the well. Drive system 110 is coupled to ESP 120 by power cable 112, which runs down the wellbore along tubing string 150.

In this embodiment, ESP 120 includes a motor section 121, a seal section 122, and a pump section 123. ESP 120 may include various other components, such as gauge packages, which will not be described in detail here because they are well known in the art and are not important to a discussion of the invention. Motor section 121 is coupled to power cable 112, and is driven by AC power (typically three-phase AC waveforms) that are received from drive system 110 through the cable. Motor section 121 drives pump section 123, thereby pumping the oil or other fluid through the tubing string and out of the well. Power for the non-motor components of the system (e.g., gauges, telemetry communication systems, etc.) may be provided from motor section 121 to the other components. Seal section 122 is provided between motor section 121 and pump section 123 for purposes including equalizing the pressure between the motor interior and the well bore and allowing the oil within the motor to expand and contract.

As will be described in more detail below, ESP 120 includes one or more mechanisms to prevent the shaft of the motor from rotating when the motor is not being driven by power provided by electric drive system 110. These mechanisms may be provided in various parts of the ESP in different embodiments. For instance, in one embodiment, a directional coupling and lock is provided as a unit which is installed between motor section 121 and seal section 122 and couples the shafts of the respective sections of the ESP. In another embodiment, a directional coupling lock is installed between the shafts of motor section 121 and seal section 122, while a lock is installed at the bottom of motor section 121. In other embodiments, these mechanisms can be installed at different locations. It should also be noted that the mechanisms which prevent the rotation of the motor section may employ different types of directional and locking mechanisms, examples of which are described below.

Figure 2:
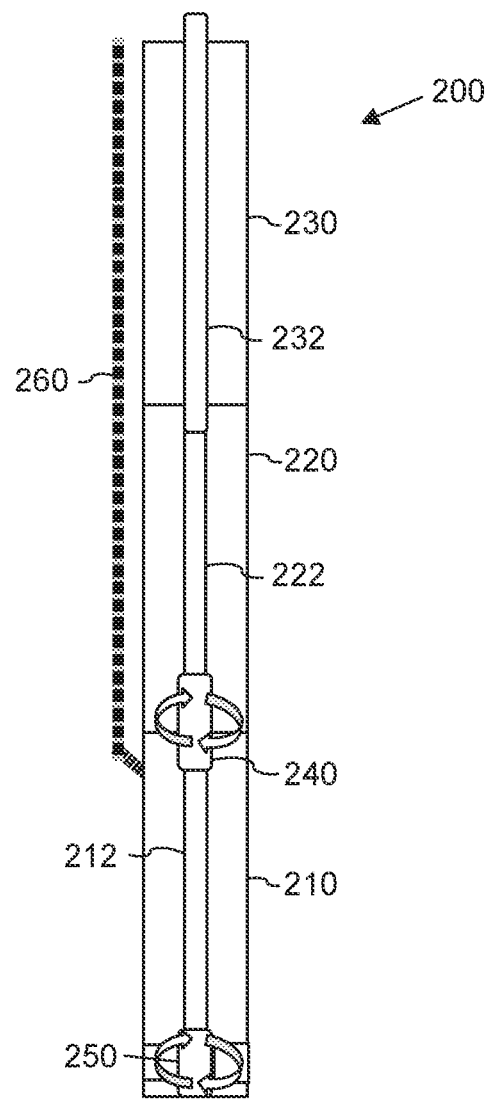
FIG. 2 is a diagram illustrating the structure of an ESP that includes a directional coupling and directional lock in accordance with some embodiments.

Referring to FIG. 2, a diagram illustrating the structure of an ESP that includes a directional coupling and directional lock in accordance with some embodiments is shown. As depicted in this figure, ESP 200 includes a motor section 210, a seal section 220, and a pump section 230. Each of these sections of ESP 200 has a corresponding shaft (212, 222, 232) that is coupled to the shaft of the adjacent section to allow motor section 210 to drive pump section 230. A directional coupling is provided to prevent the motor from rotating when it is not being driven by surface drive unit. In this embodiment, the directional coupling includes a directional shaft coupling 240 which is used to couple motor shaft 212 to seal shaft 222, and a directional lock 250 which is provided at the bottom end of motor shaft 212. Power cable 260 couples motor section 210 to the electric drive at the surface of the well.

Directional lock 250 is configured to allow motor shaft 212 to rotate only in a forward direction (i.e., the direction that drives pump section 230 to pump fluid out of the well). Directional lock 250 does not allow motor shaft 212 to rotate in the opposite direction. Directional coupling 240 is configured to allow seal shaft 222 to rotate only in the forward direction with respect to motor shaft 212. When power is applied to motor section 210, motor shaft 212 rotates in the forward direction, causing directional coupling 240 and seal shaft 222 to also rotate in the forward direction. Since pump shaft 232 is directly coupled to seal shaft 222, the forward rotation of the seal shaft causes the pump shaft to rotate in the forward direction, driving pump section 230 to pump fluid from the well.

When motor section 210 is powered off (i.e., no power is applied to the motor section via power cable 260), fluid may flow through pump section 230. Depending upon the direction of the fluid flow, this may urge pump shaft 232 to rotate in either the forward or reverse direction. If the fluid flow urges pump shaft 232 (hence seal shaft 222) to rotate in the forward direction, directional coupling 240 allows the pump shaft and seal shaft to "freewheel" with respect to motor shaft 212. That is, these shafts (222, 232) are allowed to freely rotate in the forward direction without causing motor shaft 212 to rotate. If, on the other hand, fluid flow urges pump shaft 232 and seal shaft 222 to rotate in the reverse direction, directional coupling 240 does not allow these shafts to freewheel with respect to motor shaft 212, but instead engages seal shaft 222 so that it cannot rotate with respect to motor shaft 212. In the absence of directional lock 250, this would cause motor shaft 212 to rotate in the reverse direction, which would then cause the motor to act as a generator, applying a voltage to power cable 260 which could present an electrical hazard at the surface of the well. Directional lock 250, however, is installed in motor section 210 to prevent rotation of motor shaft 212 in the reverse direction. Thus, even though directional coupling 240 engages seal shaft 222 with motor shaft 212 to urge the motor shaft in the reverse direction, directional lock 250 prevents this rotation.

Figure 3:
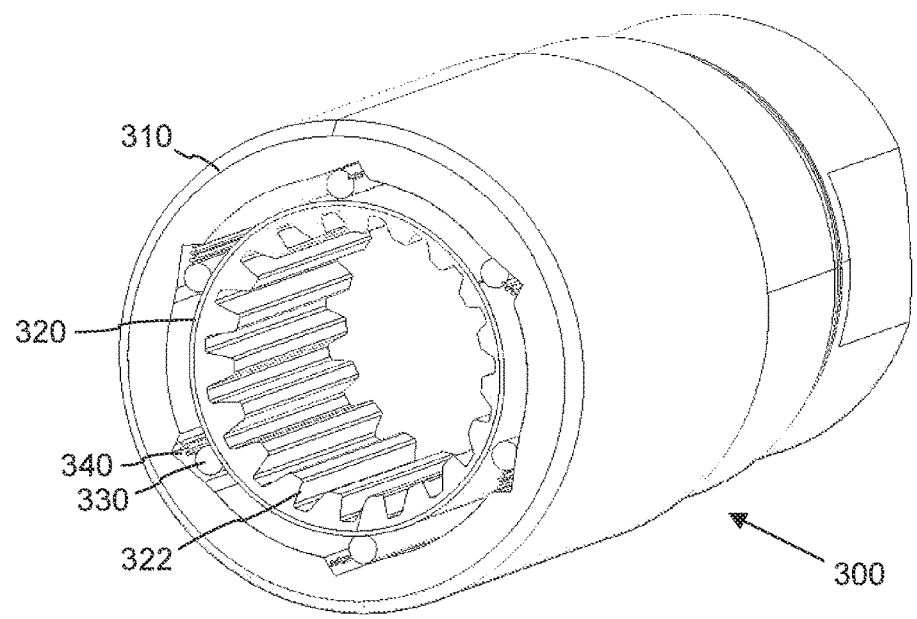
FIG. 3 is a diagram illustrating an exemplary directional coupling in accordance with some embodiments.

Referring to FIG. 3, an exemplary directional coupling is illustrated. Coupling 300 is configured to be installed between the shaft of the motor section and the shaft of the seal section as shown in FIG. 2. Coupling 300 includes an outer shell 310 which is secured to the upper end of the motor shaft, and an insert 320 which is secured to the lower end of the seal shaft. Shell 310 and insert 320 have splines (e.g., 322) to prevent these components from slipping (rotationally) on the respective shafts.

Insert 320 is coaxially positioned within shell 310 so that the insert can rotate within the shell. A mechanism is provided, however, to allow rotation only in a single direction. In this embodiment, the mechanism consists of a set of rollers (e.g., 330) that are positioned between insert 320 and shell 310. Each of the rollers is positioned within a wedge-shaped recess (e.g., 340) in the interior surface of shell 310. When insert 320 is rotated in a first direction, each of the rollers moves toward a deeper end of the wedge-shaped recess, thereby allowing the rollers to move radially outward, away from the insert. This allows insert 320 to move freely in this direction. When it is attempted to rotate insert 320 in the opposite direction, each of the rollers moves toward the more shallow end of the corresponding wedge-shaped recess. This forces the rollers radially inward, toward insert 320. The resulting friction between insert 320, rollers 330 and shell 310 prevents the insert from rotating in this direction.

Figure 4A:
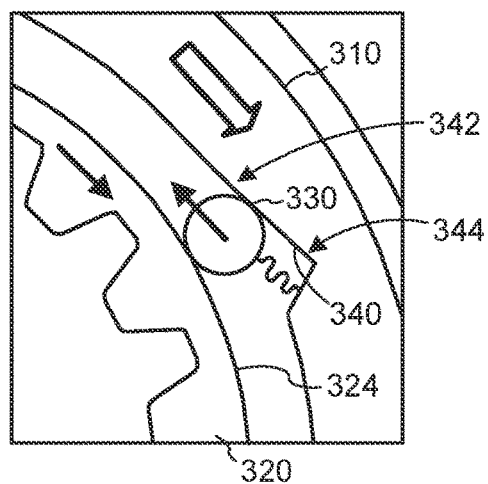
FIGS. 4A and 4B are diagrams illustrating the operation of the anti-rotation mechanism of FIG. 3.
Figure 4B:
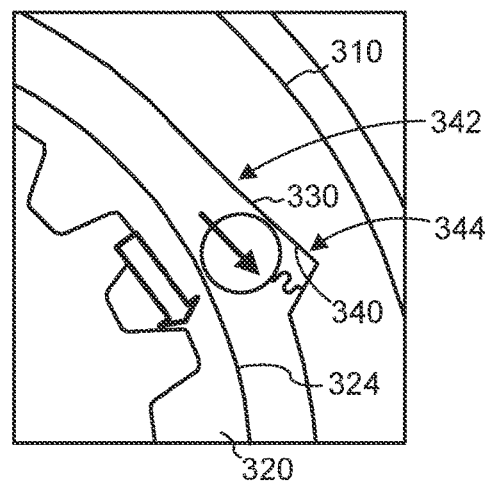

Referring to FIGS. 4A and 4B, an enlarged view of the coupling showing the operation of the anti-rotation mechanism is illustrated. FIG. 4A illustrates the manner in which the mechanism locks insert 320 against shell 310 when the shell is rotated in a clockwise direction (e.g., when the motor is powered on). FIG. 4B illustrates the manner in which the mechanism unlocks and allows insert 320 to rotate within shell 310 when the shell is rotated in a counterclockwise direction.

For the purposes of the description below, it will be assumed that the motor shaft is secured to shell 310, while the seal shaft is secured to insert 320. It should be noted, however, that this arrangement could be reversed, with the motor shaft coupled to insert 320 and the seal shaft coupled to shell 310. It should also be noted that the antirotation mechanism can be reversed in other embodiments, so that the insert moves unidirectionally in the opposite direction.

As depicted in FIGS. 3-4B, recess 340 in the interior surface 312 of shell 310 has a greater depth at one end (344) and a shallower depth at the other end (342). Thus, the distance between the interior surface 312 of shell 310 and the exterior surface 324 of insert 320 is greater at the deeper end 344 of recess 340, and is less at the shallower end 342. At the deeper end 344 of the recess, the distance between the interior surface of the shell and the exterior surface of the insert is greater than the diameter of roller 330. At the shallower end 342 of the recess, the distance between the interior surface of the shell and the exterior surface of the insert is less than the diameter of roller 330.

As depicted in FIG. 4A, shell 310 which is secured to the end of the motor shaft is being driven in a clockwise direction. As shell 310 moves in this direction, roller 330 moves upward, toward the shallower end 342 of wedge-shaped recess 340. As roller 330 approaches the shallower end 342 of wedge-shaped recess 340, it reaches a point at which the diameter of the roller is greater than the distance between the distance between the shell and the insert, so the roller is wedged between the shell and the insert, preventing movement of the insert with respect to the shell. Consequently, as shell 310 is driven in a clockwise direction, friction between roller 330 and insert 310 causes insert 320 to rotate in a clockwise direction with shell 310.

Just as clockwise rotation of shell 310 causes roller 330 to be wedged in recess 340 between the shell and insert 320, counterclockwise rotation of the insert can have the same result. That is, if insert 320 is driven in a counterclockwise direction, roller 330 will become wedged in recess 340 between the insert and shell 310, preventing rotation between the insert and the shell, and thereby causing the shell to rotate in a counterclockwise direction.

FIG. 4B depicts the circumstance in which shell 310 is driven in a counterclockwise direction. In this situation, roller 330 will move toward the deeper end 344 of recess 340. As roller 330 moves toward the deeper end of the recess, the distance between the interior surface of shell 310 and the exterior surface of insert 320 will increase, allowing the roller to move away from the insert. This reduces the friction between roller 330 and insert 320, which allows shell 310 to rotate without causing insert 320 to rotate. Similarly, if insert 320 is driven in a clockwise direction, roller 330 will move toward the deeper end of recess 340, allowing the insert to rotate freely in this direction without causing shell 310 to rotate.

Figure 5A:
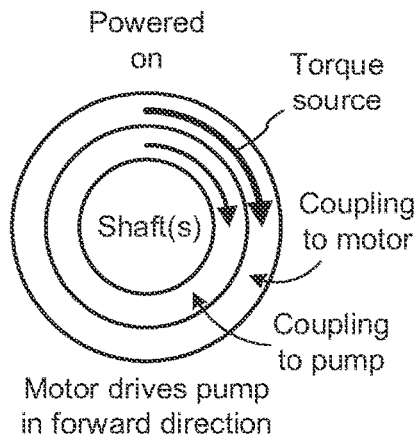
FIGS. 5A-5E are diagrams illustrating the effect of the directional coupling of FIG. 3.
Figure 5B:
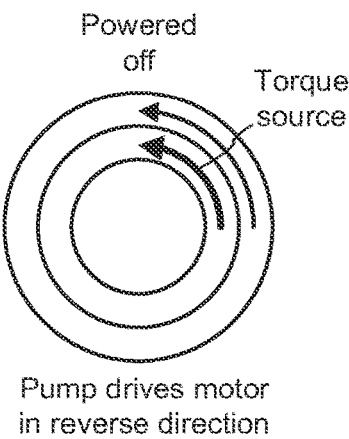
Figure 5C:
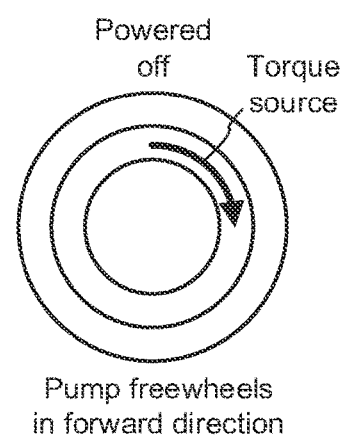
Figure 5D:
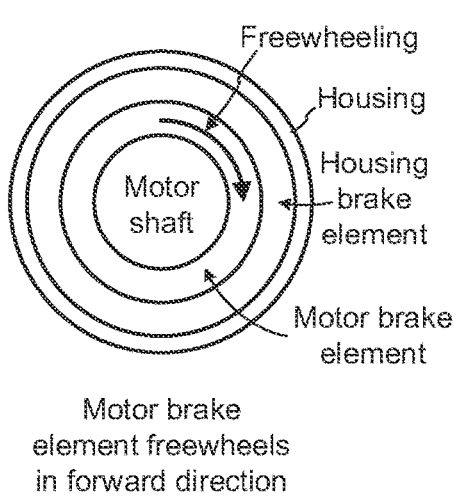
Figure 5E:
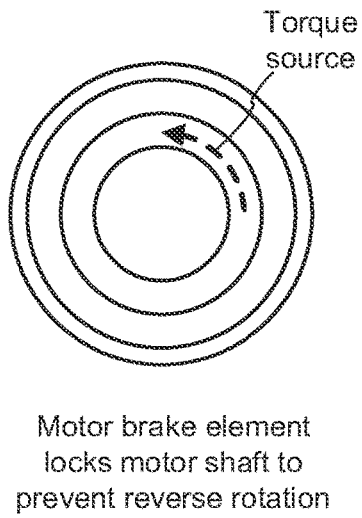

Thus, the effect of the directional coupling of FIGS. 3-4B can be summarized by FIGS. 5A-5E. FIGS. 5A-5C illustrate the clutching between the motor (outer ring) and pump (inner ring) in the absence of a directional lock between the motor and housing. FIGS. 5D-5E illustrate the clutching between the motor (middle ring) and pump (inner ring), as well as between the motor and housing (outer ring).

As shown in FIG. 5A, when the motor section of the ESP is powered on, the shell of the coupling is rotated by the motor shaft in the forward direction (clockwise in the figure), which causes the insert and the seal shaft to also rotate in the clockwise direction. As shown in FIG. 5B, when the motor section of the ESP is powered off and the seal shaft rotates the coupling insert in the reverse (counterclockwise) direction, this causes the shell and the motor shaft to also rotate in the counterclockwise direction (unless prevented by other means). As shown in FIG. 5C, when the motor section is powered off and the seal shaft rotates the insert in the forward (clockwise) direction, the insert "freewheels" and the shell of the coupling and the motor shaft are not caused to rotate.

FIGS. 5A-5C show the operation of the directional coupling between the motor and pump alone. In FIGS. 5D-5E, the effect of the directional lock between the motor and stationary housing is added. The directional lock allows the motor to rotate only in the forward (clockwise) direction. Thus, when the motor section of the ESP is powered on (FIG. 5D), the directional lock allows the motor brake element (the directional coupling between the motor and pump) to rotate with respect to the housing, so both the motor and the pump rotate in the forward direction. When the motor section of the ESP is powered off and fluid flowing through the pump causes it to rotate in the forward (clockwise) direction, the pump freewheels, so it does not cause the motor to rotate. As shown in FIG. 5E, when the motor section of the ESP is powered off, fluid flowing through the pump may apply torque to the pump shaft in the reverse direction (counterclockwise, as indicated by the dashed arrow) FIG. 5C, but it cannot rotate because the motor brake element prevents the motor shaft from rotating counterclockwise with respect to the motor, and the housing brake element (directional lock) prevents the motor brake element (hence the motor) from rotating counterclockwise with respect to the housing.

Figure 6:
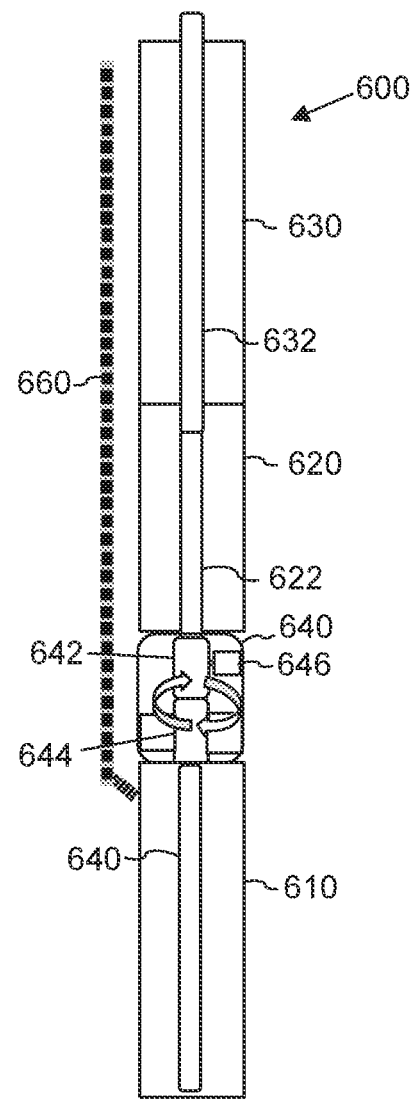
FIG. 6 is a diagram illustrating the structure of an ESP that uses a combination directional coupling and lock unit in accordance with some embodiments.

It should be noted that the coupling between motor and pump which provides pump-to-motor braking (see FIGS. 5A-5C), and the motor and housing brake elements which provide motor-to-housing braking (see FIGS. 5D-5E) are independent functions, even if housed in the same area. Thus, in some embodiments, the motor coupling and housing brake elements are separately constructed, with the motor and pump couplings installed at the top of the motor, and the motor and housing brake element installed at the bottom of the motor (e.g., as illustrated in FIG. 2). In other embodiments, the motor-to-pump coupling and motor-to-housing brake elements are constructed as a single unit. One example of this is illustrated in FIG. 6, in which a combined unit is installed at the top of the motor. The combined unit may, for example, have the motor brake and housing brake elements positioned one on top of the other, or coaxially within the unit.

In one embodiment, the directional lock may use a mechanism similar to that employed by the directional coupling. In the directional lock, the rollers would be positioned between a stationary shell that is fixed to the motor housing and the insert is coupled to the motor shaft, so that the shaft can only rotate in the forward direction. This would prevent the motor shaft from being rotated in the reverse direction, as would otherwise result in the circumstances depicted in FIG. 5B. Alternative mechanisms (e.g., simple ratcheting mechanisms) may be implemented in the directional lock in other embodiments.

It should be noted that the functions performed by the directional coupling and directional lock of FIG. 2 can also be combined in alternative embodiments. Referring to FIG. 6, a diagram illustrating an alternative embodiment that uses a combination directional coupling and lock is shown. In this embodiment, ESP 600 again includes a motor section 610, a seal section 620, and a pump section 630. ESP 600 also includes a directional coupling and lock unit 640 that is installed between motor section 610 and seal section 620. In this embodiment, the motor, seal and pump sections of the ESP may use conventional designs, with directional coupling and lock unit 640 being modularly designed with the same interfaces as the bottom of seal section 620 and the top of motor section 610. That is, the configuration of the top of unit 640 is essentially the same as the top of motor section 610, so that the unit can be secured to the bottom of seal section 620 in the same manner as motor section 610. Similarly, the configuration of the bottom of directional coupling and lock unit 640 is the same as the bottom of seal section 620, so that the unit can be secured to the top of motor section 610 in the same manner as seal section 620. It should be noted, however, that alternate embodiments may implement the directional coupling and lock unit with other configurations.

In the embodiment of FIG. 6, directional coupling and lock unit 640 includes a directional coupling component 642 which performs the same function as directional coupling 240 described above in connection with FIG. 2. This component engages when motor section 610 is powered on (by power provided via power cable 660) and motor shaft 612 rotates in the forward direction, so that seal shaft 622 is also driven to rotate in the forward direction. When motor section 610 is powered off directional coupling component 642 allows seal shaft 622 to freely rotate in the forward direction (due to fluid flow through the pump and corresponding forward rotation of pump shaft 632), even though motor shaft 612 is not rotating. If fluid flows through the pump in the opposite direction (urging pump shaft 632 and seal shaft 622 to rotate in the reverse direction), directional lock component 644 will prevent rotation in the reverse direction and will prevent motor shaft 612 from rotating.

Figure 7:
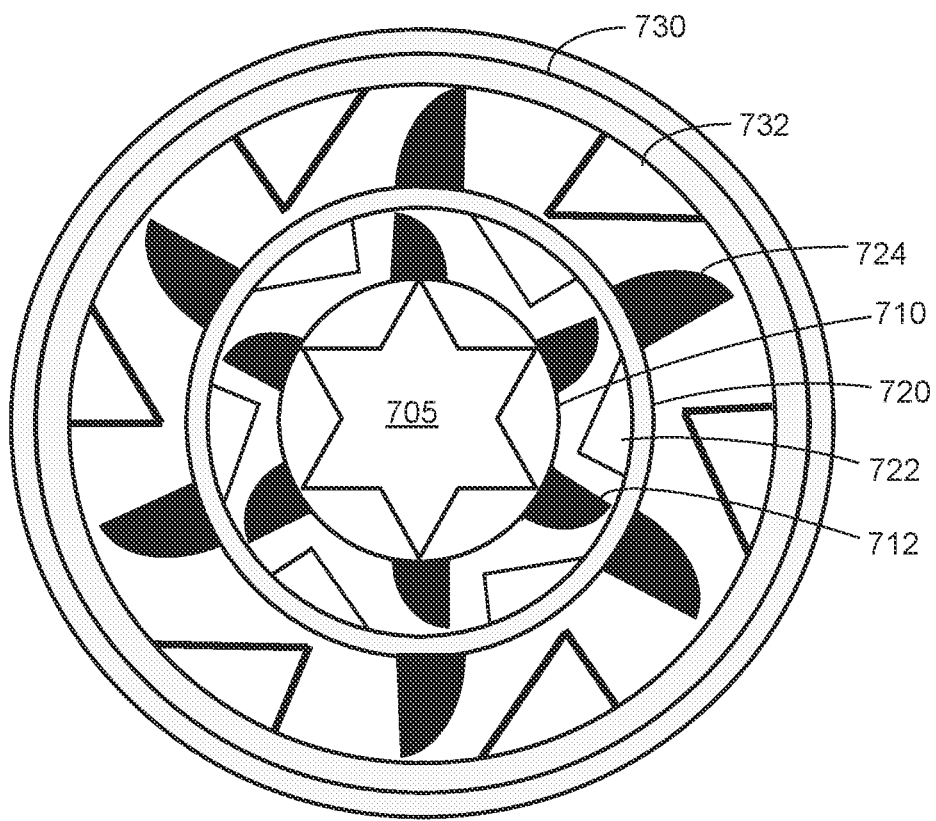
FIG. 7 is a diagram illustrating the structure of a combination directional coupling and lock unit that uses two ratcheting mechanisms in accordance with some embodiments.

Directional coupling and lock unit 640 may be implemented using any suitable mechanisms to prevent rotation of motor shaft 612 when the motor section is not powered on. In one exemplary embodiment, a first ratcheting mechanism is provided to ensure that forward rotation of the motor shaft drives forward rotation of the seal and pump shafts, while a second ratcheting mechanism is provided to prevent the pump and seal shafts from causing reverse rotation of the motor shaft. This is illustrated in FIG. 7.

As depicted in this figure, an insert 710 is secured to the motor shaft 705. Insert 710 is positioned within a shell 720 that is secured to the seal shaft. A set of pawls (e.g., 712) are provided on insert 710, and a set of teeth (e.g., 722) are provided on shell 720. When insert 710 rotates in a forward direction (counterclockwise in this embodiment), the pawls of the insert engage the teeth of the shell, causing the shell and the seal shaft to rotate in the forward direction with the motor shaft. As shell 720 rotates in the forward direction, a second set of pawls (e.g., 724) on the shell slide across a set of stationary teeth (e.g., 732) of the directional lock, so that the forward rotation of the shell and seal shaft are not impeded.

When the seal shaft and shell 720 rotate in the forward direction (while the motor shaft and insert 710 are not rotating), the shell and seal shaft are allowed to freely rotate. In this situation, the pawls (e.g., 724) and teeth (e.g., 732) of the directional lock allow the shell and seal shaft to freely rotate in the forward direction. When the seal shaft and shell 720 rotate in the reverse direction (clockwise in the figure), the pawls (e.g., 712) and teeth (e.g., 722) between insert 710 and shell 720 engage, but the pawls (e.g., 724) and teeth (e.g., 732) of the directional lock also engage, preventing reverse rotation of shell 720 with respect to stationary housing 730 of the directional lock. This prevents shell 720 from driving insert 710 and the motor shaft in the reverse direction.

The ratcheting mechanisms could be implemented at the shaft coupling, or they could be implemented at the thrust bearing or in another area of the shaft. This mechanism may be better suited to handle fluid in the production tubing of the well, but less well suited to handle a well kick.

The foregoing embodiments are intended to be illustrative of the invention rather than limiting, and alternative embodiments may uses means other than those described above to prevent rotation of the ESP motor when it is not powered on. For example, in one embodiment, a solenoid (e.g., 646 in FIG. 6) can be used to engage the shaft any time there is no voltage present at the motor terminals, and to disengage any time voltage is applied to the motor terminals. Thus, the solenoid would be normally engaged because no voltage is present. The solenoid could be used in various ways to lock the shaft, such as by providing a pin mounted directly on the solenoid that engages a slot or hole in the shaft, or by frictionally engaging the shaft to slow or stop the shaft's rotation. If fluid flows through the pump and causes a torque to be applied to the pump shaft, the solenoid prevents the pump shaft from causing the motor shaft to rotate, despite the fluid flow. When the electric drive for the ESP is energized, voltage is applied to the motor terminals, causing the solenoid to disengage and allowing the motor to rotate. Alternatively, the solenoid could be controlled by a downhole gauge, so that an operator of the ESP could send a signal to the solenoid prior to starting the motor in order to activate the solenoid and cause it to disengage from the shaft.

Thus, as described above, one embodiment comprises an ESP having a motor section, a pump section, and a directional coupling that is configured to allow a motor shaft of the motor section to rotate in a forward direction when the motor section is powered on, and to prevent the motor shaft from rotating when the motor section is powered off.

In one embodiment, the directional coupling includes a first component that allows unidirectional rotation between the motor shaft and a pump shaft of the pump section. The first component may allow the pump shaft to freewheel in the forward direction without causing the motor shaft to rotate. The directional coupling may also include a second component that allows unidirectional rotation between the motor shaft and a housing of the motor section. In another embodiment, a combined directional unit allows unidirectional rotation between the motor shaft and a pump shaft of the pump section, and unidirectional rotation between the motor shaft and a housing of the motor section, such that the pump shaft freewheels in a forward direction without causing the motor shaft to rotate in the forward direction, and both the pump shaft and motor are prevented from rotating in the reverse direction. The combined directional unit may have a modular design that enables the unit to be mounted between the motor section and seal section of the ESP, so that the unit couples the shaft of the motor section to the shaft of the seal section.

In one embodiment, a solenoid is provided to engage the motor shaft when no voltage is applied to the motor section, and to disengage the motor shaft when a voltage is applied to the motor section. The solenoid may comprise a pin mounted on the solenoid that engages a slot or hole in the shaft. Alternatively, the solenoid may be configured to frictionally engage the shaft to impede rotation of the shaft.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed by the claims of the application.

What is claimed is:

1. An electric submersible pump (ESP) system comprising:
    a motor section;
    a pump section coupled to a motor shaft of the motor section;
    a seal section that is positioned between the pump section and the motor section, wherein the seal section has a seal shaft coupled between the motor shaft and the pump shaft, wherein the seal shaft is secured to the pump shaft so that the pump shaft cannot rotate with respect to the seal shaft; and
    a directional coupling that is configured:
        to allow the motor shaft of the motor section to rotate in a forward direction and drive the pump section when the motor section is powered on,
        to enable the seal shaft to freewheel in the forward direction without causing the motor shaft to rotate, wherein the directional coupling drives the seal shaft in the forward direction when the motor shaft rotates the directional coupling in the forward direction, and
        to prevent the motor shaft from being driven by the pump section to rotate in the forward direction when the motor section is powered off;
    a directional lock coupled to the motor shaft and configured:
        to allow the motor shaft to rotate in the forward direction to drive the pump section when the motor section is powered on, and
        to prevent the motor shaft from being driven by the pump section to rotate in a reverse direction;
    a modular combined directional unit installed between the motor section and the seal section, wherein the modular combined directional unit has interfaces that are the same as interfaces at the bottom of the seal section and the top of the motor section, wherein the modular combined directional unit is secured between the motor shaft and the seal shaft with the interfaces of the modular combined directional unit coupled to respective ones of the interfaces at the bottom of the seal section and the top of the motor section;
    an outer shell secured to the motor shaft; and
    an insert secured to the seal shaft of the seal section and positioned coaxially within the outer shell.

2. The ESP system of claim 1, wherein the directional coupling comprises a directional shaft coupling which couples the motor shaft to a pump shaft of the pump section, wherein the directional shaft coupling enables the pump shaft to freewheel in the forward direction without causing the motor shaft to rotate, and wherein the directional shaft coupling drives the pump shaft in the forward direction when the motor shaft rotates the directional shaft coupling in the forward direction.

3. The ESP system of claim 2, wherein the directional coupling comprises:
   a first ratcheting mechanism configured to enable the motor shaft to rotate in the forward direction with respect to a housing of the motor section when a voltage is applied to the motor section; and
   a second ratcheting mechanism configured to enable the pump shaft to rotate in the forward direction with respect to the motor shaft.

4. The ESP system of claim 1, wherein the directional lock is configured to enable rotation of the motor shaft in the forward direction with respect to a housing of the motor section and prevent rotation of the motor shaft in the reverse direction with respect to the housing of the motor section.

5. The ESP system of claim 1, wherein the modular combined directional unit further comprises a set of mechanical elements configured to prevent the insert and the seal shaft from rotating in the reverse direction.

6. The ESP system of claim 1 wherein the modular combined directional unit comprises:
   wherein the outer shell comprises a plurality of wedge-shaped recesses in an interior surface thereof;
   wherein each of a plurality of rollers is positioned between the insert and the outer shell in a corresponding one of the wedge-shaped recesses;
   wherein rotation of the insert in the forward direction with respect to the outer shell causes each roller of the plurality of rollers to roll toward a wider end of the corresponding wedge-shaped recess, thereby enabling the insert and the seal shaft to freewheel in the forward direction with respect to the outer shell and the motor shaft; and
   wherein rotation of the outer shell in the forward direction with respect to the insert causes each roller of the plurality of rollers to roll toward a narrower end of the corresponding wedge-shaped recess, thereby frictionally engaging the insert and the outer shell and thereby preventing the insert and the seal shaft from rotating in the reverse direction with respect to the outer shell.

7. The ESP system of claim 1, wherein the directional coupling is configured to enable unidirectional rotation between the motor shaft and a pump shaft of the pump section, and unidirectional rotation between the motor shaft and a housing of the motor section, such that the pump shaft freewheels in the forward direction without causing the motor shaft to rotate in the forward direction, and both the pump shaft and motor are prevented from rotating in the reverse direction.

8. The ESP system of claim 1, wherein the directional coupling comprises a centrifugally activated clutch which selectively engages the motor shaft and a pump shaft of the pump section when the motor is operated to drive the motor shaft in the forward direction.

9. The ESP system of claim 1, wherein the directional coupling comprises a solenoid which is configured to disengage the motor shaft when a voltage from a drive unit is applied to the motor section, thereby allowing rotation of the motor shaft, and wherein the solenoid is configured to engage the motor shaft when no voltage is applied to the motor section, thereby preventing rotation of the motor shaft.

10. The ESP system of claim 9, further comprising a pin mounted on the solenoid which is configured to alternately engage and disengage a hole in the motor shaft.

11. An apparatus comprising:
    a directional coupling;
    a directional lock;
    a modular combined directional unit installed between the motor section and the seal section, wherein the combined modular directional unit has interfaces that are the same as interfaces at the bottom of a seal section and the top of a motor section of the ESP motor, wherein the modular combined directional unit is secured between a motor shaft and a seal shaft with the interfaces of the modular combined directional unit coupled to respective ones of the interfaces at the bottom of the seal section and the top of the motor section;
    an outer shell secured to the motor shaft;
    an insert secured to the seal shaft of the seal section and positioned coaxially within the outer shell;
    wherein the modular combined directional unit is adapted to be coupled to the motor shaft of the ESP motor;
    wherein the directional coupling is configured to allow the motor shaft to rotate in a forward direction when the ESP motor is powered on, and to prevent the motor shaft from rotating in the forward direction when the ESP motor is powered off;
    wherein the directional coupling comprises a directional shaft coupling which is configured to be coupled to the motor shaft and to the seal shaft, wherein the directional shaft coupling enables the seal shaft to freewheel in the forward direction without causing the motor shaft to rotate, and wherein the directional shaft coupling drives the seal shaft in the forward direction when the motor shaft rotates the directional shaft coupling in the forward direction; and
    wherein directional lock is configured to allow the motor shaft to rotate in the forward direction to drive the pump section when the motor is powered on, and to prevent the motor shaft of the ESP motor from rotating in a reverse direction.

12. The apparatus of claim 11, wherein the modular combined directional unit further comprises a set of mechanical elements configured to prevent the insert and the seal shaft from rotating in the reverse direction.

13. The apparatus of claim 11, wherein the directional coupling comprises:
    wherein the outer shell comprises a plurality of wedge-shaped recesses in an interior surface thereof;
    wherein each of a plurality of rollers is positioned between the insert and the outer shell in a corresponding one of the wedge-shaped recesses;
    wherein rotation of the insert in the forward direction with respect to the outer shell causes each roller of the plurality of rollers to roll toward a wider end of the corresponding wedge-shaped recess, thereby enabling the insert and the seal shaft to freewheel in the forward direction with respect to the outer shell; and
    wherein rotation of the outer shell in the forward direction with respect to the insert causes each roller of the plurality of rollers to roll toward a narrower end of the corresponding wedge-shaped recess, thereby frictionally engaging the insert and the outer shell and thereby preventing the insert from rotating in the reverse direction with respect to the outer shell.

14. The apparatus of claim 12, wherein the directional lock is configured to enable rotation of the motor shaft in the forward direction with respect to a housing of the ESP motor and prevent rotation of the motor shaft in the reverse direction with respect to the housing of the ESP motor.

15. An electric submersible pump (ESP) system comprising:
   a motor section;
   a pump section having a pump shaft coupled to a motor shaft of the motor section;
   a seal section that is positioned between the pump section and the motor section, wherein the seal section has a seal shaft coupled between the motor shaft and the pump shaft, wherein the seal shaft is secured to the pump shaft so that the pump shaft cannot rotate with respect to the seal shaft; and
   a directional coupling that is configured to:
      allow the motor shaft of the motor section to rotate in a forward direction and drive the pump section when the motor section is powered on,
      to enable the seal shaft to freewheel in the forward direction without causing the motor shaft to rotate, wherein the directional coupling drives the seal shaft in the forward direction when the motor shaft rotates the directional coupling in the forward direction, and
      when the motor section is powered off and when fluid flow through a pump of the pump section applies torque to the pump shaft, prevent the motor shaft from being driven by the pump shaft to rotate in the forward direction and in a reverse direction;
   a directional lock coupled to the motor shaft and configured to:
      allow the motor shaft to rotate in the forward direction to drive the pump section when the motor section is powered on, and
      prevent the motor shaft from rotating in the reverse direction;
   a modular combined directional unit installed between the motor section and the seal section, wherein the modular combined directional unit has interfaces that are the same as interfaces at the bottom of the seal section and the top of the motor section, wherein the modular combined directional unit is secured between the motor shaft and the seal shaft with the interfaces of the modular combined directional unit coupled to respective ones of the interfaces at the bottom of the seal section and the top of the motor section;
   an outer shell secured to the motor shaft; and
   an insert secured to the seal shaft of the seal section and positioned coaxially within the outer shell.

16. The ESP system of claim 1, wherein the modular combined directional unit further comprises a set of mechanical elements configured to prevent the insert and the seal shaft from rotating in the reverse direction.

* * * * *